United States Patent [19]
Ramsbottom

[11] Patent Number: 5,313,326
[45] Date of Patent: May 17, 1994

[54] CAR HEAD-UP DISPLAY INCLUDING A FRESNEL MIRROR AND A CURVED MIRROR

[75] Inventor: Andrew P. Ramsbottom, Bolton, United Kingdom

[73] Assignee: Pilkington plc, St. Helens, United Kingdom

[21] Appl. No.: 953,263

[22] Filed: Sep. 30, 1992

[30] Foreign Application Priority Data

Oct. 4, 1991 [GB] United Kingdom ................. 9121154

[51] Int. Cl.$^5$ ......................... G02B 27/10; G02B 5/10
[52] U.S. Cl. .................................... 359/631; 359/633; 359/851; 359/857; 359/834; 359/727; 359/730
[58] Field of Search ............... 359/631, 633, 630, 851, 359/857, 834, 727, 730

[56] References Cited

U.S. PATENT DOCUMENTS

| | | | |
|---|---|---|---|
| 3,690,240 | 9/1972 | Gold | 359/851 |
| 3,744,391 | 7/1973 | Plummer | 359/853 |
| 4,006,971 | 2/1977 | Plummer | 359/858 |
| 4,220,400 | 9/1980 | Vizenor | 359/631 |
| 4,711,512 | 12/1987 | Upatnieks | 359/630 |
| 5,087,116 | 2/1992 | Taylor | 359/857 |

FOREIGN PATENT DOCUMENTS

| | | |
|---|---|---|
| 0391231 | 10/1990 | European Pat. Off. . |
| 0416222 | 3/1991 | European Pat. Off. . |
| 0420228 | 4/1991 | European Pat. Off. . |
| 2297431 | 8/1976 | France . |

*Primary Examiner*—Jon W. Henry
*Attorney, Agent, or Firm*—Burns, Doane, Swecker & Mathis

[57] ABSTRACT

A projection unit for a car head-up display comprises a display source, a curved mirror which provides the optical power of the projection unit and, in use, receives light from the display source, and a Fresnel mirror extending generally between the display source and the curved mirror and disposed to receive reflected light from the curved mirror and to reflect that light in a desired direction. The curved mirror and the Fresnel mirror may be disposed on a solid block of transparent material having one curved end coated to provide the curved mirror, the display source being located at an opposite end of the block, and the Fresnel mirror being formed in a block face extending from the opposite end of the block to the curved end of the block. A car head-up display including the projection unit may be located in a car with the projection unit being oriented whereby the said desired direction is towards a combiner which, in use, reflects light towards the driver's eyes, the combiner preferably being the car windscreen.

10 Claims, 4 Drawing Sheets

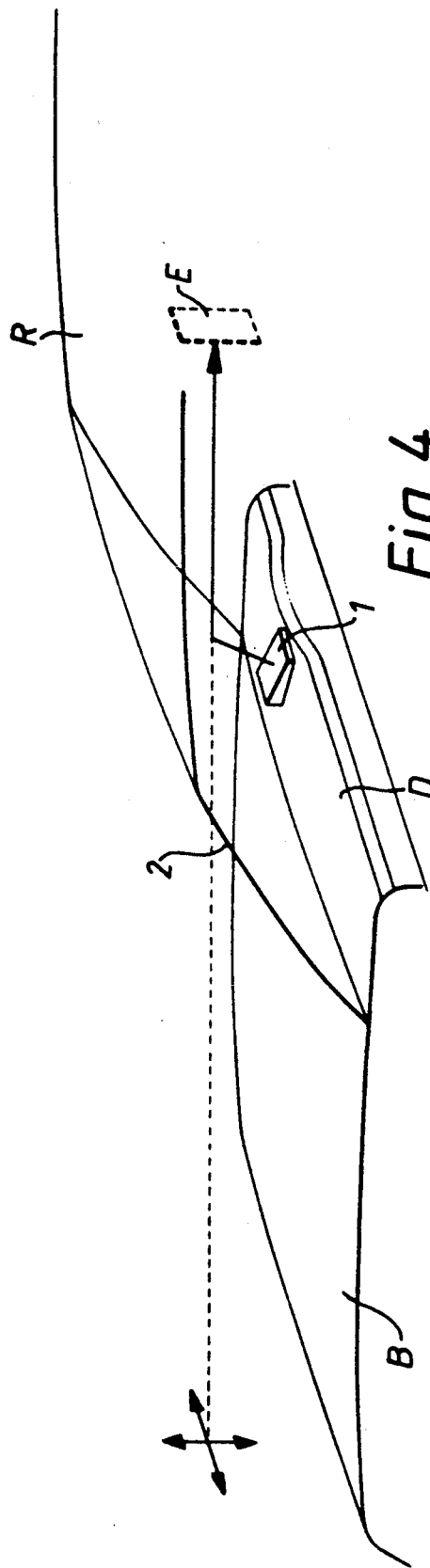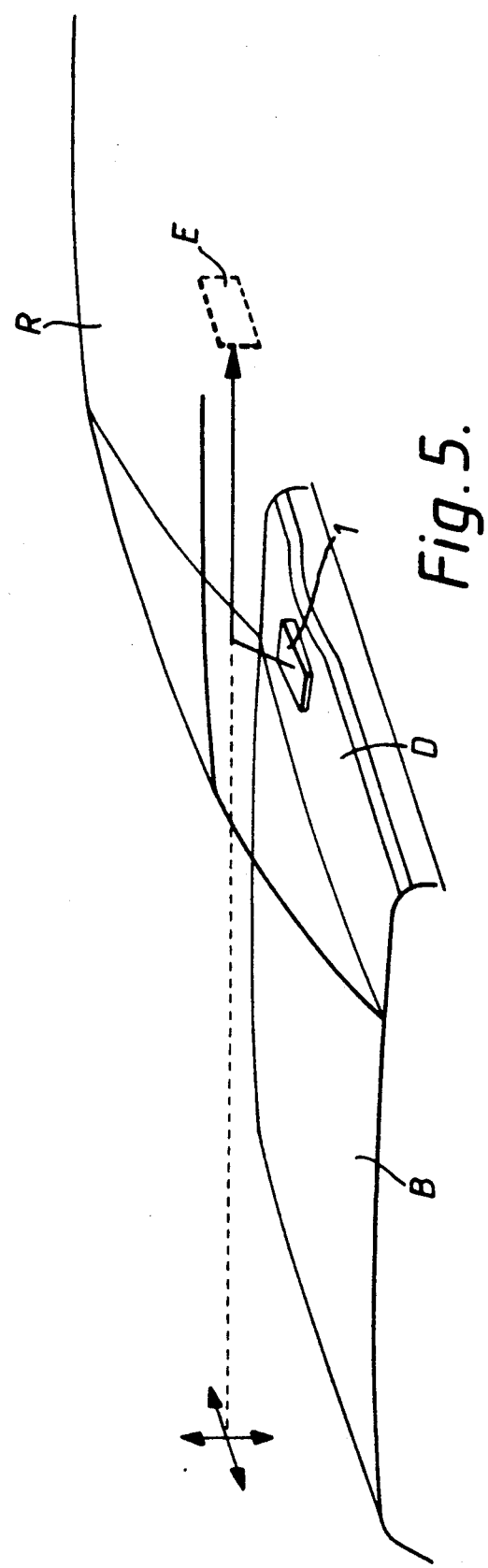

CAR HEAD-UP DISPLAY INCLUDING A FRESNEL MIRROR AND A CURVED MIRROR

BACKGROUND TO THE INVENTION

This invention concerns improvements in or relating to car head-up displays and more particularly to projection units for such displays.

DESCRIPTION OF THE PRIOR ART

Head-up displays are well known in aircraft for superimposing on the pilot's view a display of instrumentation or other information. The pilot sees a collimated image of the display which he can observe without having to look down or change his eye focus. Usually in an aircraft head-up display there is a projection unit incorporating a lens or lens system which effects the collimation and a folding mirror which folds the light path so as to direct the display light towards a combiner through which the pilot views. An example of an aircraft head-up display projection unit can be found in UK patent application GB 2 240 853A, the unit comprising a cathode ray tube providing the display, a collimating lens to collimate light from the display and a folding mirror which receives light from the lens and reflects it towards a combiner. In that particular example the folding mirror is a holographic, diffractive or Fresnel device.

In automotive or car head-up displays the requirements may be different from those in aircraft and in particular a simpler and more compact projection unit may be wanted. This is because the unit needs to fit into a relatively small space, e.g. in the dashboard, so that there is insufficient room for complex lens systems and folding mirrors. One problem with such simple and compact arrangements can be that the effective eye box presented to the car driver (i.e. the amount of head movement allowed before the image is no longer seen) is very limited in size.

SUMMARY OF THE INVENTION

According to the present invention there is provided a projection unit for a car head-up display, the projection unit comprising a display source, a curved mirror which, in use, provides the optical power of the projection unit and receives light from the display source, and a Fresnel mirror extending generally between the display source and the curved mirror and disposed to receive reflected light from the curved mirror and to reflect that light in a desired direction. When the projection unit is mounted in a car that direction is towards a combiner which reflects the light towards the driver's eyes, which combiner may be the car windscreen.

The curved mirror may be of spherical, toroidal or other aspheric form in order to achieve an optimum balance of aberrations. The Fresnel mirror performs an asymmetric reflection which serves effectively to extend the aperture of the projection unit and hence the eye box, and it may be oriented to provide the extended eye box in a desired direction, e.g. in the horizontal direction or the vertical direction. Preferably the Fresnel mirror extends substantially the full distance from the display source to the curved mirror.

The projection unit preferably comprises a solid block of transparent material having one curved end coated to provide the curved mirror, the display source being located at the opposite end, and the Fresnel mirror being formed in the block face extending from the display source end to the curved mirror end. While the Fresnel mirror surface may be coated if desired, the arrangement is conveniently such that reflection therefrom is achieved by total internal reflection. Compensating optics, for example an aspheric lens surface, may be provided on the face of the block opposite the Fresnel mirror face.

BRIEF DESCRIPTION OF THE DRAWINGS

In order that the invention may be better understood, apparatus in accordance with it will now be described by way of example, with reference to the accompanying drawings, in which.

DETAILED DESCRIPTION OF THE PREFERRED EMBODIMENTS

Figure 1:
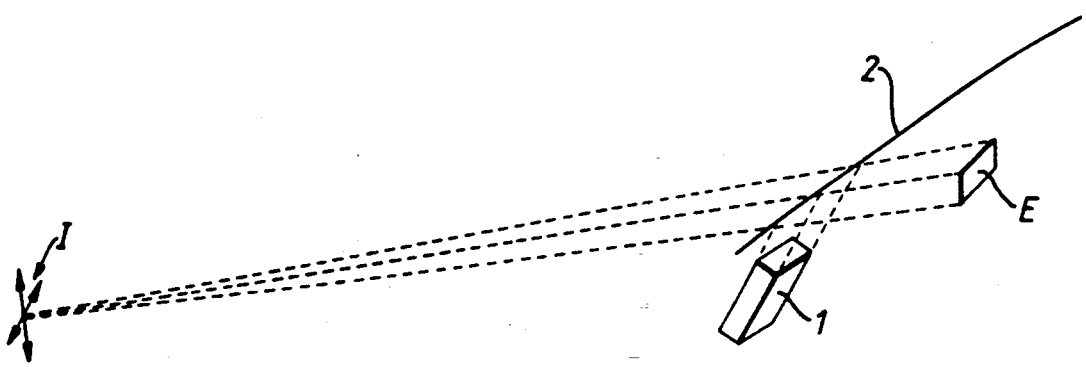
FIG. 1 is a schematic representation of a car head-up display.

FIG. 1 schematically indicates an optical projection unit 1 which projects display light towards a car windscreen 2 which reflects that light towards the car driver's eye position E. Such reflection may be simply from the untreated surface of the windscreen, or may be from a coated patch or a hologram in or on the windscreen. The driver sees an image I of the display projected in front of him at a desired position, which may for example be about 2 meters ahead of the windscreen or could be more. The distance of the image is largely determined by the optical power of the projection unit which, if it actually collimated the display light, would produce the image at infinity. It will be understood that the effective eye box presented to the driver, i.e. the area within which he will be able to see the image I, is inherently limited by the effective aperture of the optical projection unit 1. It is obviously desirable that the eye box should be as large as possible for reasons of driver comfort, range of information to be displayed, tolerance of the system to driver height variation, driver head movement, etc. It is also desirable to have the most compact optical projection unit 1 possible since available space in the car for the projection unit is limited. There are, however, two major limitations on the length of the projection unit and the size of the eye box which is achievable.

Firstly, while the use of more powerful optics will permit a shorter physical length unit for a fixed image projection distance, this will give a higher magnification of the display. The higher the magnification of the system, then the smaller the actual display source required in order to maintain a specified image size. Display sources are generally of limited resolution so there is a minimum practical display size achievable before the resolution becomes a limitation and, for example, individual pixels become clearly visible and distracting to the driver.

Secondly it is a fundamental limitation of optical systems that for a given eye box a shorter focal length system cannot achieve as good an image quality as a long focal length system (assuming an optimum balance between the various image aberrations in each case). Consequently, as the length of the unit is reduced the achievable image quality will degrade, eventually to an unacceptable level. There is therefore a limit to the minimum practical length attainable for the projection unit 1.

Figure 2:
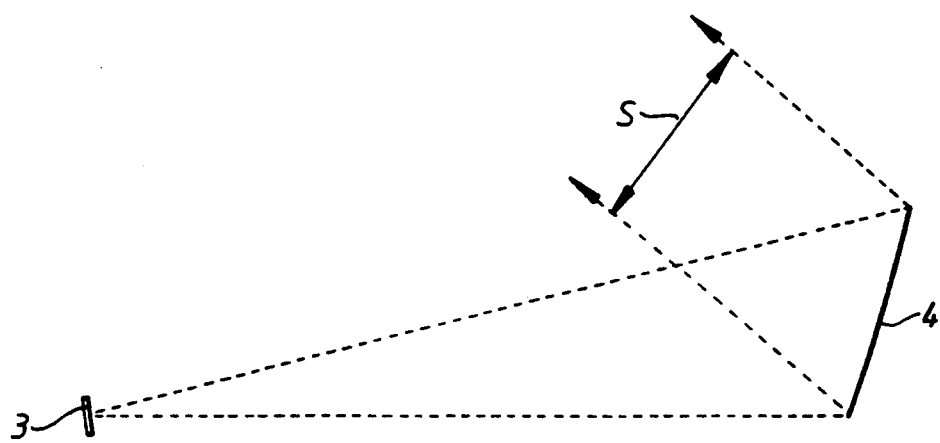
FIG. 2 is a diagram illustrating the operation of a car head-up display projection unit.
Figure 3:
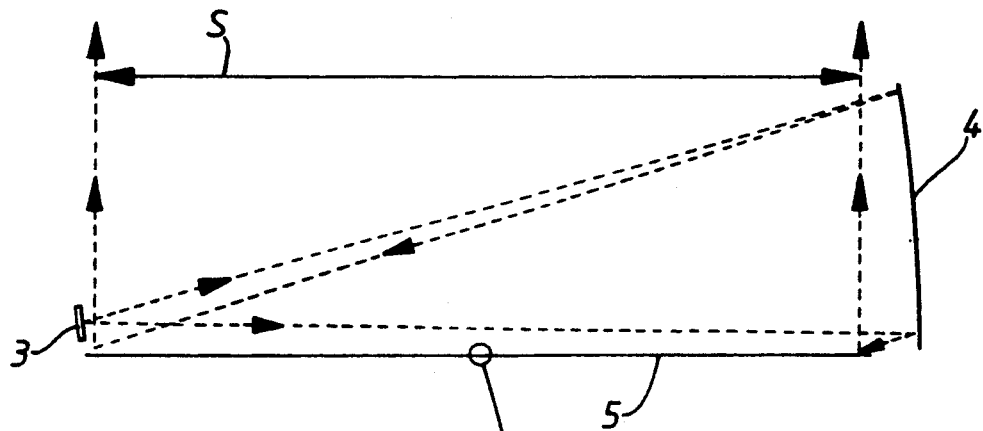
FIG. 3 is a diagram similar to FIG. 2 in respect of a projection unit in accordance with the invention.
Figure 3A:
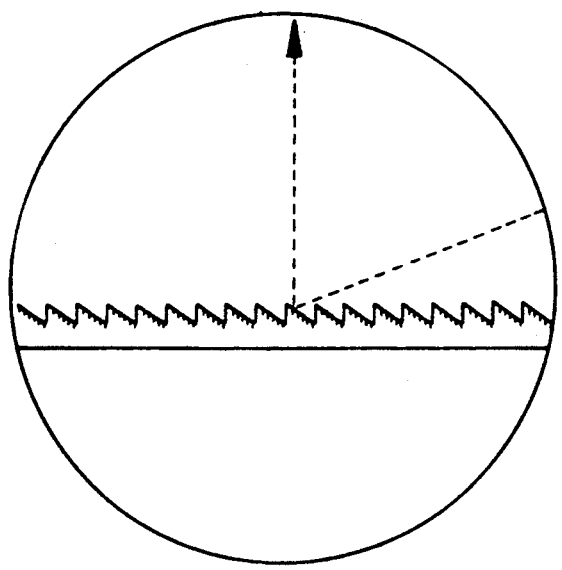
FIG. 3a is a closeup of a portion of FIG. 3, FIG. 4 schematically illustrates an extended vertical eye box size using a projection unit in accordance with the invention, FIG. 5 schematically illustrates an extended horizontal eye box size using a projection unit in accordance with the invention.

FIG. 2 diagrammatically shows a display source 3 from which light travels to a concave curved mirror 4 which reflects the light towards windscreen for viewing by the driver. The eye box size indicated as S can be seen to be dependent on the size of the mirror 4. FIG. 3 is similar to FIG. 2 but shows the curved mirror 4 in a differently angled disposition with respect to the display source 3 such that the mirror 4 reflects the display light towards a Fresnel mirror 5, shown in closeup in FIG. 3a, extending generally between the display source 3 and the curved mirror 4. The Fresnel mirror 5 is of known form having a multiplicity of reflective facets parallel to each other and at an angle to the plane of the mirror as a whole. The light received by the Fresnel mirror 5 is reflected upwardly from its facets so as to give an eye box size S corresponding to the length of the Fresnel mirror. The Fresnel mirror 5 therefore effectively extends the eye box in one direction.

The curved concave mirror 4 provides the power of the projection unit and may be of spherical, toroidal or other aspheric curvature as desired to achieve an optimum balance of aberrations. It will be seen that the projection unit system diagrammatically shown in FIG. 2 is of the same length as the projection unit system diagrammatically shown in FIG. 3. The eye box size S, however, is very different, the extended size in FIG. 3 being limited only by the total length of the system when the Fresnel mirror 5 extends the full distance from the display source 3 to the curved mirror It will be understood that the direction of extension of the eye box size by use of the Fresnel mirror may be selected to suit particular requirements. Thus, for example, the projection unit may be oriented to increase the vertical eye box size as shown in FIG. 4, or to increase the horizontal eye box size as shown in FIG. 5. Both these figures schematically indicate a car bonnet or hood B, dashboard D and roof R as well as the car windscreen 2.

Figure 6:
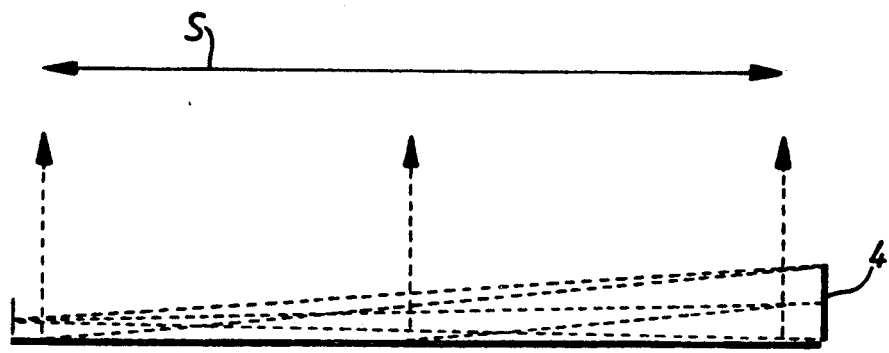
FIG. 6 is similar to FIG. 3 but showing a slimmed projection unit, FIG. 7 schematically shows a solid block projection unit in accordance with the invention, and FIG. 8 schematically shows a modified version of the embodiment of FIG. 6.

It will be appreciated that since, as explained above with reference to FIG. 3, the eye box size is determined by the length of the system and not by the size of the other optical components, and in particular of the curved mirror 4, this curved mirror can be made small providing a very slim compact unit configuration. Such slim configuration is illustrated in FIG. 6 which shows a projection unit of essentially the same length as that in FIG. 3 but with a much smaller curved mirror 4. This mirror 4 may be a distinct separate optical element, but conveniently the projection unit may be fabricated as a solid block.

Figure 7:
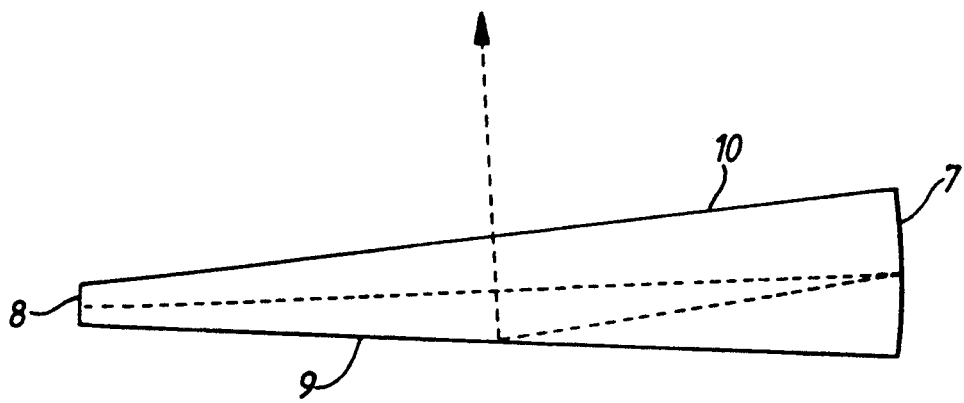

Such an embodiment is shown in FIG. 7 which illustrates a solid block 6 of glass or plastic, conveniently formed by moulding, having a curved convex surface 7 at one end and a narrow planar surface 8 at the other. The lower face 9 extending between the ends 7 and 8 is formed as the Fresnel mirror. The convex surface 7 is suitably coated to render it internally reflective and the display source is located against the end face 8 so that light from that source travels along the block, is internally reflected from the coated surface 7, is then internally reflected from the Fresnel mirror on surface 9, and then travels upwardly to emerge through the upper face 10 of the block. The Fresnel surface 9 may be coated if desired but conveniently the Fresnel facet angles are such that the angle of incidence of light on them is greater than the critical angle required for total internal reflection (about 40° to the normal for a glass-air interface). Reflection from the Fresnel mirror can then occur simply by total internal reflection avoiding the need for reflective coating of the Fresnel surface. It will be appreciated that this further reduces the cost of the unit, which can be relatively low for a simple moulding.

Figure 8:
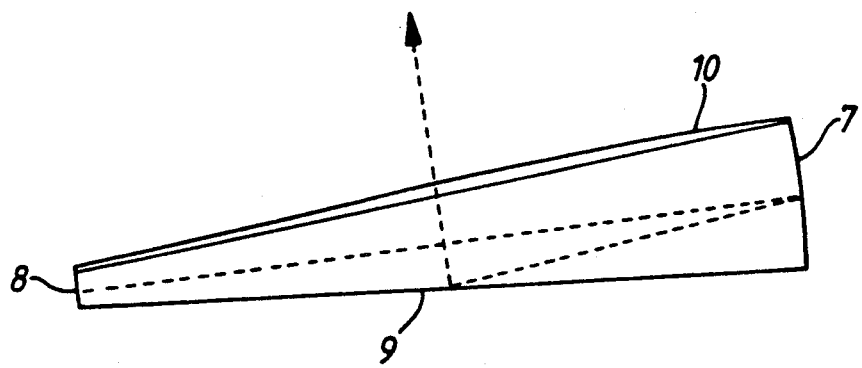

The projection unit may incorporate additional large aperture compensating optics without significantly increasing the size of the block. Such optics can simply be placed effectively above the block parallel to its length. An example of this is illustrated in the FIG. 8 embodiment in which the upper surface 10 of the block is shaped as an aspheric lens surface. This can improve image quality and compensate for image aberrations which may be introduced by the complex shape of the windscreen 2 towards which light is projected from the block.

It will be understood that, while a simple moulded unit is a convenient low cost way of producing a projection unit in accordance with the invention, other methods of manufacture could be employed. Thus metal materials could be used for the reflecting surfaces and the units could be fabricated by grinding and polishing, stamping, pressing or machining. The unit is preferably fabricated as a single block but could be formed from a number of discrete units bolted or cemented together if desired.

It will be appreciated that the display source may take any convenient form but will generally consist of an electronic display (e.g., LED, vacuum fluorescence, liquid crystal, or cathode ray tube). It will further be understood that the system may incorporate further optical elements if desired but, as explained previously, compactness and simplicity are generally preferred.

What we claim is:

1. A projection unit for a car head-up display, the projection unit comprising a display source, a curved mirror which provides the optical power of the projection unit and, in use, receives light from the display source, and a Fresnel mirror extending generally between the display source and the curved mirror and disposed to receive reflected light from the curved mirror and the reflect that light in a desired direction.

2. A projection unit according to claim 1 wherein the curved mirror is spherical, toroidal or other aspherical form.

3. A projection unit according to claim 1 wherein the Fresnel mirror extends substantially the full distance from the display source to the curved mirror.

4. A projection unit according to claim 1 wherein the curved mirror and the Fresnel mirror are disposed on a solid block of transparent material having one curved end coated to provide the curved mirror, the display source being located at an opposite end of the block, and the Fresnel mirror being formed in a block face extending from the said opposite end to the said curved end.

5. A projection unit according to claim 4 wherein an optical compensating device is provided on the face of the block opposite the Fresnel mirror face.

6. A projection unit according to claim 5 wherein the optical compensating device is an aspheric lens surface.

7. A projection unit according to claim 1 wherein the Fresnel mirror surface is coated with a mirror coating.

8. A projection unit according to claim 1 wherein the Fresnel mirror is adapted to reflect light by total internal reflection.

9. A car head-up display according to claim 1 including a projection unit according to any foregoing claim 1 located in a car, the projection unit being oriented whereby the said desired projection is towards a combiner provided in a car which, in use, reflects light towards the driver's eyes.

10. A car head-up display according to claim 9 wherein the combiner is the car windscreen.

* * * * *